May 1, 1951  W. V. JOHNSON  2,551,006
TURBINE TYPE INTERNAL-COMBUSTION ENGINE
Filed May 19, 1948  2 Sheets-Sheet 1
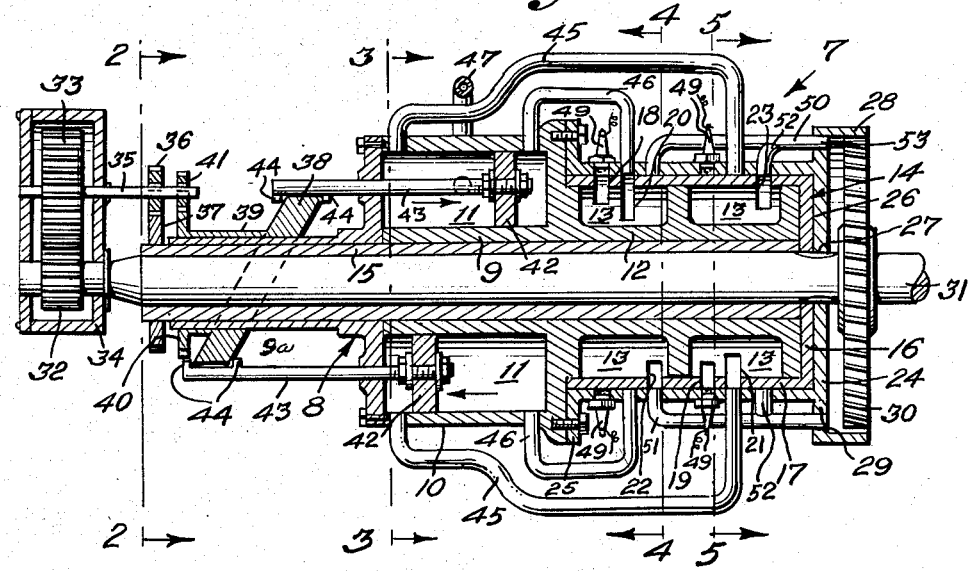
Fig. 1.
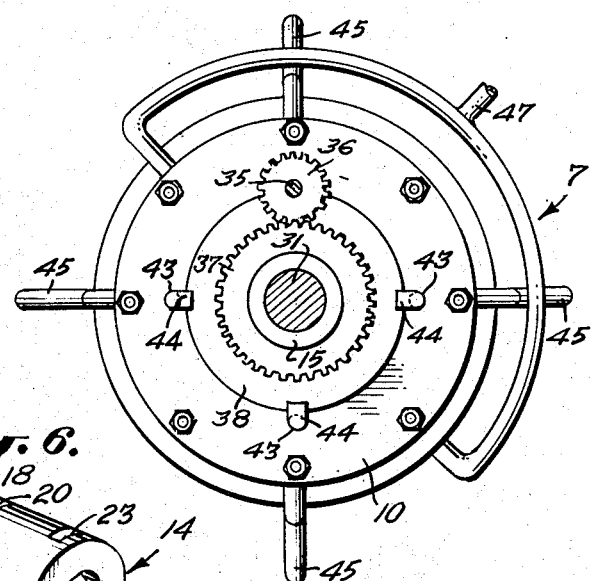
Fig. 2.
Fig. 6.
INVENTOR.
Waverly V. Johnson
BY
John H. Randolph
Attorney May 1, 1951 W. V. JOHNSON 2,551,006
TURBINE TYPE INTERNAL-COMBUSTION ENGINE
Filed May 19, 1948 2 Sheets-Sheet 2
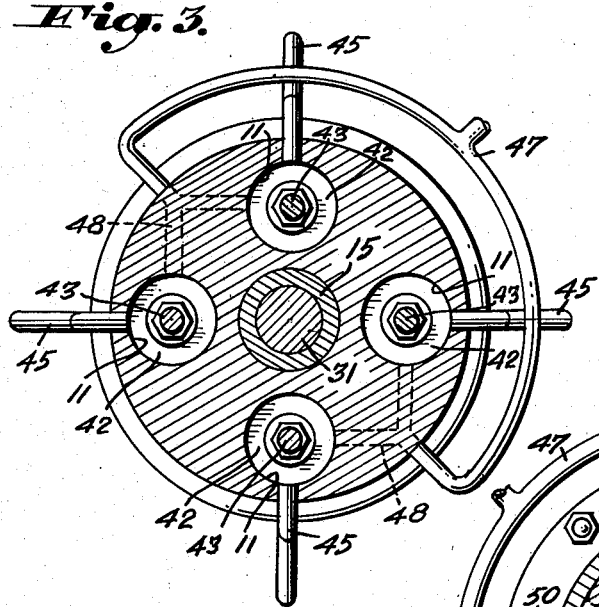
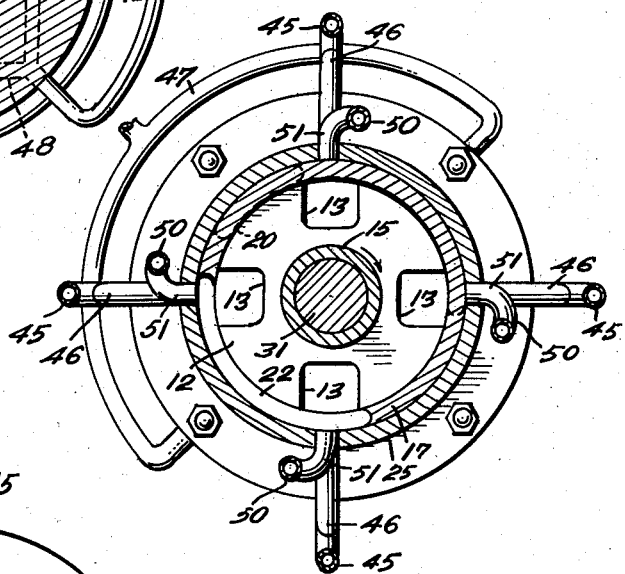
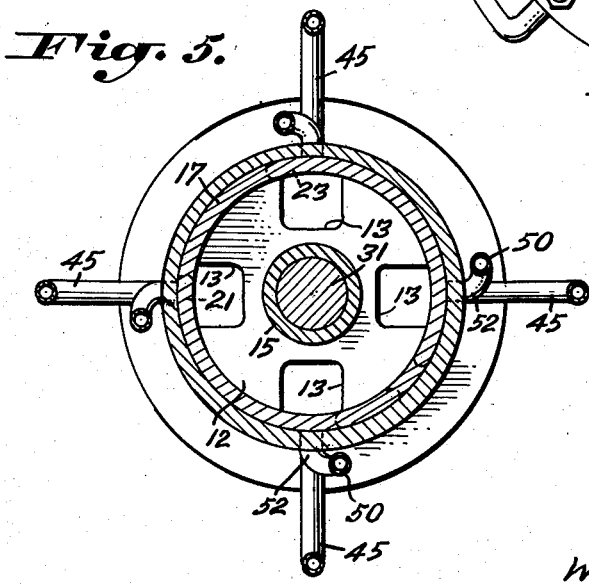
INVENTOR.
Waverly V. Johnson
BY
John N. Randolph
Attorney.

Patented May 1, 1951

2,551,006

UNITED STATES PATENT OFFICE 2,551,006

TURBINE TYPE INTERNAL-COMBUSTION ENGINE

Waverly V. Johnson, Champaign, Ill.

Application May 19, 1948, Serial No. 28,006

8 Claims. (Cl. 60—41)

This invention relates to a novel construction of a turbine type internal combustion engine and has for a primary object to provide an engine of extremely simple construction which will be very efficient and economical in operation and which eliminates the use of the conventional rotary type compressor for compressing the fuel charge and a substantial portion of the power loss normally resulting from the operation thereof.

Another and important object of the invention is to provide an engine wherein the usual combustion cylinders and pistons will be eliminated and which is provided with combustion chambers in which the fuel is burnt and from which the compressed combustion gases are ejected against a turbine wheel for driving the driven shaft of the engine and whereby all of the energy developed by the combustion of the fuel mixture is utilized and without the usual loss which results in conventional internal combustion engines due to the action of the pistons.

Still another object of the invention is to provide a novel means affording a direct control of the engine power and whereby the same amount of fuel at the same pressure will be admitted to each of the combustion chambers irrespective of the speed of operation of the engine.

Still another object of the invention is to provide an engine of the aforedescribed character of extremely simple and durable construction composed of a minimum of parts and which is capable of being readily assembled and dismantled.

Various other objects and advantages of the invention will hereinafter become more fully apparent from the following description of the drawings, illustrating a presently preferrred embodiment thereof, and wherein:

Figure 1 is a longitudinal, substantially central sectional view partly in elevation of a preferred embodiment of the invention;

Figures 2, 3, 4 and 5 are cross sectional views of the engine taken substantially along planes as indicated by the lines 2—2, 3—3, 4—4 and 5—5, respectively, of Figure 1, and Figure 6 is a perspective view of a portion of the engine shown detached.

Referring more specifically to the drawings, the novel turbine type internal combustion engine constituting the invention is designated generally 7 and includes an elongated engine casting, designated generally 8 having a central sleeve portion 9 extending from end-to-end thereof. The casting 8 is provided with an enlargement 10 formed integrally around the sleeve 9 and intermediate of the ends thereof and which is recessed to provide four substantially equally spaced cylinders 11. The casting 8 is also provided with an enlargement 12 at one of its ends which is likewise preferably circular in cross section and of an exterior diameter less than the enlargement 10 and which is provided with longitudinally and circumferentially spaced outwardly opening recesses or chambers 13 including two annular sets of chambers each composed of four chambers and accordingly constituting a total of eight of the chambers 13.

A sleeve valve, designated generally 14 includes an elongated inner sleeve 15 which extends through and is journaled in the casting sleeve 9 and which is provided at one end thereof with an outwardly projecting annular wall 16 which is disposed beyond and bears against the outer end of the casting enlargement 12. An outer sleeve 17, forming a part of the sleeve valve unit 14 is disposed concentrically around an end of the inner sleeve 15 and has one end thereof formed integral with the marginal portion of the end wall 16. The sleeve 17 is journaled around the casting enlargement 12 and extends substantially from end-to-end thereof and is provided with circumferentially and longitudinally spaced ignition slots 18 and 19, circumferentially and longitudinally spaced fuel inlet slots 20 and 21, and circumferentially and longitudinally spaced exhaust slots 22 and 23.

A cover member 24 is disposed over the outer sleeve 17 and has an externally flanged open end 25 which abuts against the inner end of the casting enlargement 10, outwardly of the enlargement 12 and which is bolted thereto, as illustrated in Figure 1. The cover member 24 has an opposite end wall 26 which bears against the annular wall 16 and which is provided with a central opening 27 which aligns with the bore of the sleeve 15. The cover member 24 is also provided with an enlarged annular wall 28 which projects in a direction away from the casting 8 and which is formed integral with the end wall 26 by an annular enlargement 29 thereof.

The annular wall 28 forms an outwardly opening housing for a turbine wheel 30 which is disposed for rotation therein and which is fixed to a drive shaft 31 which extends through the opening 27 and longitudinally through the sleeve 15 and which is journaled in said parts.

One end of the shaft 31, remote to the turbine wheel 30, projects from the adjacent end of the sleeve 15 and has a pinion fixed thereto as seen at 32 which meshes with a relatively large gear 33. The pinion 32 and gear 33 are contained in a housing 34 in which is journaled a shaft 35 to which the gear 33 is fixed. A pinion 36 is keyed to the shaft 35, externally of the housing 34 and meshes with a gear 37 which is fixed to the sleeve 15 beyond the adjacent end of the sleeve 9.

A disk 38 which is canted with respect to the longitudinal axis of the engine 7 is journaled on the sleeve 9a adjacent the end thereof remote to the enlargement 12 and is provided with a hub 39 which extends toward the gear 37 and which is provided on the end thereof adjacent said gear 37 with a gear 40 which meshes with a pinion 41 also fixed to the shaft 35 so that the sleeve valve 14 and the canted disk 38 will be revolved by the drive shaft 31 and in the same direction as said drive shaft but at reduced speed, for a purpose which will hereinafter become apparent.

A piston 42 is reciprocally mounted in each cylinder 11 and each of the pistons is provided with a piston rod 43 which extends reciprocally through the outer end of the casting enlargement 10. Each piston rod 43 is provided with spaced laterally projecting studs or enlargements 44 at its outer end for straddling the peripheral portion of the disk 38 whereby when said disk is revolved the piston rods 43 and pistons 42 will be reciprocated. The portions of the casting 10 through which the piston rods 43 reciprocally extend may be provided with suitable stuffing boxes, not shown, for a purpose which will hereinafter become apparent.

Each cylinder 11 has an end of a conduit 45 opening into the chamber thereof adjacent its outer end and said conduits 45 have their opposite ends extending through a cylindrical wall of the cover 24 for communication with the chambers 13 of the series of said chambers which are located at the outer end of the casting portion 12 when the intake slot 21 is in registration with said conduits 45, for supplying the compressed fuel charge thereto, as will hereinafter become apparent. A fuel supply conduit 46 has an end communicating with each cylinder 11 adjacent the inner end thereof and said conduits 46 have their opposite ends opening through the cylindrical wall of the cover 24, each for communication with one of the other set of combustion chambers 13 through the intake slot 20, when said slot is in registration with said conduits 46. It will thus be readily apparent that each of the fuel compressing cylinders 11 communicates with each of the two combustion chambers 13 which is in longitudinal alignment therewith and accordingly the engine 7 is equipped with four of the conduits 45 and four conduits 46 A fuel supply conduit 47, connected to a suitable source of fuel supply, not shown, has a bifurcated discharge end as seen in Figure 2, the two legs of which each discharge into a substantially Y-shaped port 48 the diverging legs of which each discharge into one of the cylinders 11, intermediate of the ends thereof, so that the four cylinders 11 are supplied by the two furcations or legs of the supply pipe 47 and the two furcations or legs of the discharge port 48.

The cylindrical wall of the cover member 24 is provided with an opening in radial alignment with each of the combustion chambers 13, in each of which openings is mounted a spark plug or the like 49 which ignition devices 49 are in communication with their chambers 13 when the ignition slots 18 and 19 are in registration with said chambers 13. It will be readily apparent that a suitable ignition system, not shown, may be provided which will be operated by and synchronized with the drive shaft 31 so that the spark plugs 49 will fire when the slots 18 and 19 are in registration therewith and at which time the combustion chambers will contain a compressed charge of the fuel mixture.

An exhaust conduit 50 serves each of the pair of longitudinally aligned combustion chambers 13 and each of said conduits 50 is provided with two lateral inlet ports or branches 51 which extend through the cylindrical wall of the cover 24 and one of which branches 51 of each conduit 50 communicates with an inner chamber 13 through an exhaust slot 22 and the other of which communicates with an outer chamber 13 through an exhaust slot 23 of the sleeve valve 14. The opposite, discharge end of each conduit 50 as seen in 53 extends through the wall portion 29 and discharges toward the turbine wheel 30 so that the discharge of the exhaust under pressure from the conduits 50 against the inclined blades of the turbine wheel 30 will revolve said wheel and the drive shaft 31 in a clockwise direction looking from right to left of Figure 1 or as seen in Figure 4 for thereby driving the sleeve valve 14 and the cam disk 38 in the same direction.

From the foregoing it will be readily apparent that during each revolution of the cam disk 38 each of the pistons 42 will be reciprocated back and forth once in its cylinder 11 and in moving inwardly of said cylinder 11 will compress a charge of fuel between the piston and inner end of the cylinder which fuel charge will be forced through the conduit 46 thereof and discharged into the aligned inner combustion chamber 13 through the slot 20 as said piston 42 approaches the inner end of its cylinder 11. At the same time, the fuel charge will be drawn into the outer end of the cylinder 11 behind the piston 42 to be compressed as the piston moves toward the outer end of the cylinder as this fuel charge is in turn forced through the conduit 45 and discharged into the outer aligned combustion chamber 13 through the registering slot 21 which moves into registry therewith as the piston approaches the outer end of said cylinder. At the same time, a combustion charge is drawn into the inner end of the cylinder behind the piston to be compressed on its return stroke for discharge through the conduit 46, as previously described. Likewise, by the connection of the sleeve valve unit to the drive shaft 31 through the gears 33 and 37 and pinions 32 and 36, as previously described, the sleeve valve unit in addition to moving the intake ports 20 and 21 into and out of registry with the conduits 46 and 45, respectively, will also cause the ignition slots 18 and 19 to move into and out of registry with the combustion chambers 13 and spark plugs 49 so that when said ignition slots are registered with the plugs 49 the fuel chargers which have been compressed into said combustion chambers will be ignited after the intake slots 20 and 21 have moved out of registry with the conduits 46 and 45 and as the exhaust slots 22 and 23 are moving into position so that the branch conduits 51 and 52, respectively, will be in registry with the combustion chambers 13 in which the ignition is occurring. As previously described, the exhaust from the ignited combustion charges in the chambers 13 will pass through the conduits 50 and be discharged from the ends 53 thereof against the vanes of the turbine wheel 30 for driving the shaft 31 of the engine 7.

Various modifications and changes are contemplated and may obviously be resorted to, without departing from the spirit or scope of the invention as hereinafter defined by the appended claims.

I claim as my invention:

1. A turbine type internal combustion engine comprising an engine casting, a sleeve valve unit having a central sleeve portion journaled in and extending axially through the engine casting, said sleeve valve unit having an outer sleeve portion rotatably disposed around a portion of the engine casting, said engine casting portion having outwardly opening chambers or recesses forming combustion chambers, said engine casting having an enlarged portion spaced from said aforementioned casting portion and provided with longitudinally disposed cylinders, a piston reciprocally disposed in each cylinder, a drive shaft extending through and journaled in the inner sleeve of the sleeve valve unit, power take-off means for driving the sleeve valve unit from the drive shaft, a cam disk journaled on a portion of the engine casting and driven by said power take-off means, means connecting each of the pistons to said cam disk whereby the pistons will be reciprocated when the cam disk is revolved, fuel supply means communicating with each of said cylinders, conduit means extending from each end of each of the cylinders for supplying a fuel charge under pressure to the combustion chambers, said outer sleeve having circumferentially extending fuel inlet slots movable into and out of registry with said fuel supply conduits for admitting the compressed fuel charges to each of said combustion chambers, igniting means for igniting the fuel charge in each of the combustion chambers during each revolution of the sleeve valve unit, said outer sleeve having exhaust slots for communication with each of the combustion chambers during each revolution of the sleeve valve unit, exhaust conduits communicating with said combustion chambers through said exhaust slots for receiving the exhaust gases under pressure from said chambers, and a turbine wheel fixed to the drive shaft and against which said exhaust conduits discharge for revolving the turbine wheel and drive shaft.

2. A turbine type internal combustion engine as in claim 1, said combustion chambers being stationary, and a cover member detachably disposed over the outer sleeve and secured to the engine casting for mounting the discharge ends of the fuel supply conduits and the inlet ends of the exhaust conduits.

3. A turbine type internal combustion engine as in claim 1, said combustion chambers being stationary, and a cover member detachably disposed over the outer sleeve and secured to the engine casting for mounting the discharge ends of the fuel supply conduits and the inlet ends of the exhaust conduits, said ignition means being mounted in said cover member, said outer sleeve having circumferentially extending ignition slots movable into and out of registry with the combustion chambers and said ignition means.

4. An internal combustion engine of the turbine type comprising an engine casting having a plurality of circumferentially spaced outwardly opening recesses formed in a portion thereof, said portion being circular in cross section, a sleeve valve rotatably disposed about said portion and covering the recesses thereof and combining therewith to form combustion chambers, said casting having a series of longitudinally disposed cylinders, pistons reciprocally disposed within said cylinders, means for supplying a fuel mixture to said cylinders, a drive shaft journaled longitudinally of the engine casting, gear means driven by said drive shaft, a cam driven by said gear means for reciprocating said pistons, conduits leading from the ends of said cylinders for conveying compressed charges of the fuel mixture to said combustion chambers, said sleeve valve having circumferentially extending inlet ports movable into and out of communication with the fuel supply conduits for admitting the fuel charges to the combustion chambers, and ignition means for each combustion chamber, said sleeve valve having ignition ports movable into and out of registry with the ignition means, said sleeve valve having circumferentially extending exhaust ports movable into and out of registry with said combustion chambers, exhaust passages having inlet ends disposed for communication with said combustion chambers through said exhaust ports, and a turbine wheel fixed to the drive shaft and against the blades of which the exhaust gases under pressure are discharged from said exhaust passages for revolving the turbine wheel and drive shaft.

5. An internal combustion engine as in claim 4, said engine casting being provided with two annular rows or sets of said combustion chambers.

6. An internal combustion engine as in claim 4, said engine casting being provided with two annular rows or sets of said combustion chambers, and each of said cylinders aligning with two longitudinally spaced combustion chambers and being connected by one of said supply conduits to each of said chambers whereby when the piston is moved in one direction a compressed charge of fuel will be supplied to one of said conduits and when the piston is moved in the opposite direction a compressed fuel charge will be supplied to the other of said chambers.

7. An internal combustion engine of the turbine type comprising an engine casting having an outwardly opening recess defining a combustion chamber, a sleeve valve rotatable therearound and having an ignition port, an intake port and an exhaust port therein, a fixed supply conduit for communication with said combustion chamber through said intake port during a portion of each revolution of the sleeve valve, an exhaust conduit for communication with the combustion chamber through the exhaust port during a portion of each revolution of the sleeve valve, means for igniting a fuel charge contained within said combustion chamber through the ignition port when said port is in registry with the ignition means and combustion chamber, a drive shaft, reduction gearing for driving the sleeve valve from the drive shaft, and a turbine fixed to the drive shaft and driven by the exhaust gases from said exhaust conduit.

8. An internal combustion engine of the turbine type comprising an engine casting having an outwardly opening recess therein, a sleeve valve rotatably mounted on the engine casting around said recess and combining therewith to define a combustion chamber, said sleeve valve having an intake port and an exhaust port therein each defined by a circumferentially elongated opening, a fixed fuel supply conduit communicating with the intake port during a portion of each revolution of the sleeve valve, means for supplying a fuel mixture under pressure to the fuel supply conduit, an exhaust conduit communicating with the combustion chamber through the exhaust port during a portion of each revolution of the sleeve valve, said sleeve valve having an opening forming an ignition port, ignition means for igniting the fuel charge in the combustion chamber through the ignition port in one position of the sleeve valve, a drive shaft journaled in the engine casting, a turbine fixed to the drive shaft and driven by the exhaust gases from the exhaust conduit, reduction gearing driving the sleeve valve from the drive shaft, and power take-off means connecting the fuel supply means to the drive shaft.

WAVERLY V. JOHNSON.

REFERENCES CITED

The following references are of record in the file of this patent:

FOREIGN PATENTS

| Number | Country | Date |
| --- | --- | --- |
| 16,728 | Great Britain | Nov. 26, 1915 |
| 142,959 | Great Britain | May 20, 1920 |
| 257,264 | Great Britain | Mar. 24, 1927 |